(12) United States Patent
Ferren et al.

(10) Patent No.: US 10,392,024 B2
(45) Date of Patent: Aug. 27, 2019

(54) MODULAR VEHICLE

(71) Applicant: APPLIED MINDS, LLC, Burbank, CA (US)

(72) Inventors: Bran Ferren, Beverly Hills, CA (US); W. Daniel Hillis, Encino, CA (US)

(73) Assignee: APPLIED MINDS, LLC, Burbank, CA (US)

( * ) Notice: Subject to any disclaimer, the term of this patent is extended or adjusted under 35 U.S.C. 154(b) by 471 days.

(21) Appl. No.: 15/015,872

(22) Filed: Feb. 4, 2016

(65) Prior Publication Data

US 2016/0152243 A1   Jun. 2, 2016

Related U.S. Application Data

(63) Continuation of application No. 10/750,189, filed on Dec. 30, 2003, now Pat. No. 9,254,877.

(60) Provisional application No. 60/437,413, filed on Dec. 30, 2002.

(51) Int. Cl.

| | |
|---|---|
| *B60W 50/00* | (2006.01) |
| *B62D 25/00* | (2006.01) |
| *B62D 39/00* | (2006.01) |
| *B60W 40/12* | (2012.01) |
| *B62D 21/00* | (2006.01) |
| *B62D 65/02* | (2006.01) |
| *B60P 3/42* | (2006.01) |
| *B60R 11/00* | (2006.01) |

(52) U.S. Cl.
CPC ............ *B60W 50/00* (2013.01); *B60W 40/12* (2013.01); *B62D 21/00* (2013.01); *B62D 25/00* (2013.01); *B62D 39/00* (2013.01); *B62D 65/024* (2013.01); *B60P 3/42* (2013.01); *B60R 2011/0043* (2013.01)

(58) Field of Classification Search
CPC combination set(s) only.
See application file for complete search history.

(56) References Cited

U.S. PATENT DOCUMENTS

| | | |
|---|---|---|
| 4,676,545 A | 6/1987 | Bonfilio et al. |
| 4,737,055 A | 4/1988 | Scully |
| 4,842,326 A | 6/1989 | DiVito |
| 4,887,859 A | 12/1989 | Aper |
| 5,301,997 A | 4/1994 | Cudden |
| 5,467,827 A | 11/1995 | McLoughlin |
| 5,573,300 A | 11/1996 | Simmons |
| 5,785,372 A | 7/1998 | Glatzmeier et al. |
| 5,912,511 A | 6/1999 | Hidaka |
| 6,099,070 A | 8/2000 | Yocum |
| 6,301,528 B1 | 10/2001 | Bertram et al. |

(Continued)

*Primary Examiner* — Thomas G Black
*Assistant Examiner* — Ana D Thomas
(74) *Attorney, Agent, or Firm* — Michael A. Glenn; Perkins Coie LLP

(57) ABSTRACT

The invention is a modular vehicle that is intended for a variety of operations including both military and civilian operations. The vehicle addresses the issue of performing special purpose tasks that the vehicle is asked to do. Such tasks can be accomplished by configuring the vehicle as an ambulance, as a fire-fighting vehicle, as a communications van, as a command and control vehicle, etc. Thus, the vehicle is readily adapted using standardized and customized modules that are readily attached to a standardized platform that includes an appropriate interconnection means.

21 Claims, 9 Drawing Sheets

(56) References Cited

U.S. PATENT DOCUMENTS

| | | |
|---|---|---|
| 6,421,593 B1 | 7/2002 | Kempen et al. |
| 6,527,495 B2 | 3/2003 | Humphries et al. |
| 6,542,789 B2 | 4/2003 | Ufheil |
| 6,547,506 B1 | 4/2003 | Jacob |
| 6,584,881 B1 | 7/2003 | Boudreau et al. |
| 6,671,582 B1 | 12/2003 | Hanley |
| 6,698,634 B2 | 3/2004 | Thomson |
| 6,899,379 B1 | 5/2005 | Milenovich |
| 6,923,282 B2 | 8/2005 | Chernoff et al. |
| 2002/0101088 A1 | 8/2002 | Rigau |
| 2002/0158490 A1 | 10/2002 | Hutzel |
| 2003/0038468 A1* | 2/2003 | Chernoff ................ B60L 58/40 280/781 |

* cited by examiner

MODULAR VEHICLE

CROSS REFERENCE TO RELATED APPLICATIONS

This Application is a Continuation of U.S. application Ser. No. 10/750,189, entitled Modular Vehicle, which was filed on 30 Dec. 2003, which claims priority to U.S. Provisional Application No. 60/437,413, entitled Modular Vehicle, which was filed 30 Dec. 2002, which are each incorporated herein in its entirety by this reference thereto.

BACKGROUND

Technical Field

The invention relates to the design and operation of vehicles. In particular, the invention relates to vehicles that can be operated in a variety of operating environments and perform a variety of specialized functions.

Description of the Prior Art

Traditionally, vehicles designed to perform specialized tasks are indeed truly specialized, and are ill suited for more general application. When removed from their designed operating environment, their performance degrades markedly. As a result, organizations such as law enforcement agencies, emergency response units, and the military accumulate a large fleet of vehicles, each of which is capable of performing in a single specific environment.

A great reduction in vehicle inventory could be achieved if a single, reconfigurable vehicle platform were able to provide equivalent functionality. Organizations could then purchase fewer units, reconfiguring the units on an as needed basis for a particular end use.

Automobile designers and manufacturers have proposed several concepts directed towards this goal. For example, GM has recently introduced a concept vehicle, known as the Autonomy project, based on a thin, fuel cell powered chassis to which various vehicle bodies may be attached. Integrated Concepts and Research Corporation (ICRC) has described a Transformer Truck configurable for service as a cargo truck, wrecker, dump truck, personnel carrier or self-loading ISO container hauler.

However, neither of these vehicles truly provides an easily configurable vehicle platform suitable for nearly any envisioned end use.

SUMMARY

The invention is a modular vehicle that is intended for a variety of operations including both military and civilian operations. The vehicle addresses the issue of performing special purpose tasks that the vehicle is asked to do. Such tasks can be accomplished by configuring the vehicle as an ambulance, as a fire-fighting vehicle, as a communications van, as a command and control vehicle, etc. Thus, the vehicle is readily adapted using standardized and customized modules that are readily attached to a standardized platform that includes an appropriate interconnection means.

Traditionally, there had either been a general purpose vehicle, such as a van or a pick-up truck that was not customized to do a particular function well, or there has been a highly customized vehicle such as an EMT rescue vehicle, a fire fighting command post and such, which is optimized to do a particular function but does only that function. Thus, the traditional approach presents problems with regard to flexibility. For example, a fire department may need a power generator or emergency outdoor lighting one day and may need a communications tower or an ambulance the next day. Maintaining an inventory of such vehicles is expensive and difficult. The invention is intended to answer that need.

The invention starts with a standardized vehicle platform and modifies the vehicle with modular components. For example, additional weight bearing capacity may be added to the vehicle, for example by adding an additional axle to make a 4×4 vehicle into a 6×6 vehicle. A receiver frame may be placed on top of an existing vehicle frame or the vehicle frame itself may provide this functionality, rather than having traditional bolt or welding points. Thus, the invention herein provides a pre-built fixturing system that uses either released implants or other retainment means, which may also include bolts.

The modules are preferably of several standardized sizes. In the preferred embodiment of the invention, the foundation of the platform, the chassis, can receive one large module on its bed or two half-sized modules or one half-sized and two-quarter sized modules. Because the chassis or receiver frame is pre-drilled, for example as is done with an equipment rack, a variety of modules can be accommodated easily. Further, the chassis or the receiver frame is constructed with the strength and rigidity necessary to support such modules, commensurate with the anticipated weight, power, and capacity of the vehicle.

The invention addresses a further problem of providing services to the modules. Services could include such things as high voltage AC power, low voltage DC power, 25 volts or 12 volts. There may be a need for cooling if the modules that are attached to the platform include heat generating devices, whether it is water-cooling or some other capacity. It may be necessary to provide air pressure. For example, if a pneumatic mast is provided, then there must be an air compressor associated with the vehicle. In this case, air would have to be distributed to the various elements that require pneumatic power. Hydraulic fluids would also need to be distributed, for example if there is a power take-off on the truck which runs on a hydraulic system to operate various implements that are built into it.

The invention contemplates a set of quickly releasable and self-sealing connectors that employ standardized methods with regard to where the connector is located on the vehicle. The vehicle also includes a wiring trough that goes from the front end of the vehicle to the back and that is pre-wired to provide connections for digital and analog signals and other elements. A communication bus is also provided along the path.

The invention also provides a dedicated control pathway that allows sub panels to be placed, for example, inside the cab providing direct control of potentially dangerous elements that would not typically be run through a general purpose control system running on a vehicle computer. For example, for a military weapons system, a separate control might be provided. For civilian use, there may be a mast that elevates, and a standard control system may cause the mast to raise at an inappropriate time, thereby creating a safety hazard. Such functions as control of weapons or the mast are referred to as mission critical elements that must be controlled and cannot be subject to computer error or bugs.

Thus, the invention may be analogized to a general purposes computer that has an operating system and a series of applications and peripheral hardware devices. In the context of the invention, the vehicle has an operating system that is used to control and recognize the various modules that are attached to the platform in a manner similar to plug-in driver software, where a module is recognized when it is attached to the platform. Thus, the module identifies its functionality and capabilities to the computer of the system built into the vehicle. The module has a series of custom interfaces on it that allow contact closures, lighting, power control, and interfaces to other computers that might be on board each module.

The module may also have a pre-loaded personality, for example so that the control system recognizes it as a power module. Thus, the system knows where the power module is and what it is. The module may also tell the computer that it is an unknown and the computer then must obtain driver software necessary for the module, which may for example may be downloaded to operate the module.

The vehicle operating system provides control to the driver's and other stations. There may be, for example, a driver's station, a passenger's station, and back seat stations for various technicians responsible for the functionality employed in the various modules. These functions can be specialized so that the driver concentrates on safely operating the vehicle. For example the person in the right front seat might be the communications person, while the person in the back seat might operate equipment, such as electro-optic masts, camera systems, videos, fire fighting equipment, etc. The control system knows how to partition itself so people are only able to perform tasks that are appropriate for their functions and locations in the vehicle. The system imposes an interlock so that functions are only implemented at appropriate times.

In the example of a mast, the system would not let the person in the right seat raise the mast. Only the driver could raise the mast because the driver would know when the vehicle is not moving and it is safe to so operate the mast. There may also be logic in the vehicle that senses the vehicle's motion and/or gear position, and determines whether or not the mast can be raised. Thus, the vehicle implements a series of conditional branching statements in its operating system that implement rules such as "Never raise the mast when the engine is running," "Don't allow the engine to start while the mast is up," "Don't raise the mast If the vehicle is indoors." There are sensor and operating relations established in the operating system so that the vehicle knows how to manage such activities of these modules for safety and or performance.

The operating system within the vehicle can also understand preloaded parameters, such as weight, center of gravity, and balance. Thus, if a given set of modules is stacked onto the platform, the vehicle is intelligent and can calculate, for example, the vehicle center of gravity. The vehicle might determine that there is, for example, a very high roll center and therefore determine that it unsafe to drive the vehicle at speeds of more than 45 mph. In this event, the vehicle may warn the vehicle operator and or may inhibit the vehicle's ability to travel above the safe speed.

The various modules are recognized upon being installed. The computer within the vehicle acknowledges the module and performs a background calculation for weight, balance, and power consumption, for example. In the case of power consumption, the vehicle might recognize that putting two lighting modules on the vehicle exceeds the rating of the generator that comes with the vehicle. This may alert the operator as to the need for sharing this load between the two lighting modules, or ask the operator to determine how much power goes to each module so that the available power may be used in the most effective way. In any event, the system would recognize that excessive power was required and would protect itself against damage or unsafe operation that may result from drawing more current than is available.

The installed modules also auto configure. The central processor recognizes these modules by such unique characteristics as a serial number, a bar code, and/or a configuration of mechanical pins at the point of engagement. Files inside the module may inform the central processor of attributes of the module, such as weight, size, power requirements, and capabilities. A history of the module may also be provided, including information such as past problems and total operating time.

From this information the central processor can determine what the capabilities are for each module and the combination of modules. The central processor also determines if the configuration is unsafe or unworkable due to excess weight or power demands. The central processor can also determine if any software or driver updates or enhancements are available and/or required for the installed modules.

The physical connections of the modules are standardized, allowing them to be attached and removed without special training. When removed, the modules can be fitted with protective plates or caster bases, allowing them to be transported safely and easily. The connection between the module and the vehicle frame provides all necessary power, hydraulics, pneumatics, cooling, and data connections required by this module. The data may be provided by a physical connection or by an optical or RF link. The optical link may be IR beam through free air, or an RF connection, such as specified by BlueTooth or IEEE802.11.

In summary, the invention provides at least the following unique elements that address the problems attendant with the prior art:

1. Assembling a set of special purpose modules onto a vehicle bed in a mix and match fashion so that the vehicle is readily provided with the functionality desired for particular applications;
2. A plurality of specialized self-identifying modules that report to a central control system within the vehicle such parameters as weight, power consumption, size, and functionality, so that the modular elements fit within the design limits of the platform, and such that the user interface, i.e. the driver and other operator controls, are dynamically configured to express the functionality of the modules installed on the platform;
3. Unique identification of the various modular elements such that a central control element within the platform can update the module, unlock or add functions in installed modules, or accept new modules;
4. A common connection for mechanical, electrical, and fluid elements that make such mechanical, electrical, and fluid expedients available to the various modules without the need for special wiring, running of conduits, or provision of special mechanical fittings.

DETAILED DESCRIPTION

Figure 1:
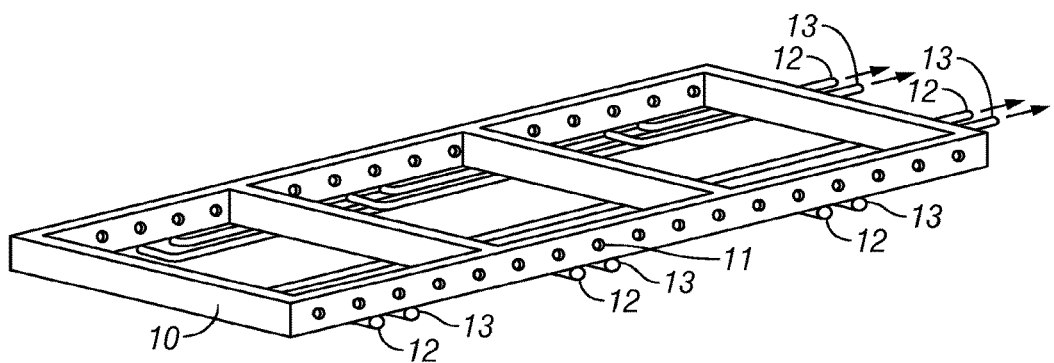
FIG. 1 shows a vehicle platform for receiving modules of a modular vehicle in accordance with an embodiment of the present invention.

The invention is a modularly reconfigurable vehicle capable of serving an extremely wide range of end uses. Equipment suited for a particular end use is installed using a standardized connection system, allowing rapid and convenient exchange of individual components or entire configurations. The standardized connection also provides flexibility in installation location, allowing for more optimal distribution of equipment weight on the underlying vehicle platform.

Equipment is selected and installed in a modular manner, with each module providing a unique function. Examples of functionality provided by individual modules include:
- Additional passenger seating
- Additional fuel capacity
- Light weaponry capability
- RF communication
- Scissor lift
- Telescoping mast
- Electronic surveillance
- RDF
- RF communication monitoring, and
- Video cameras (visual and infrared)

To ease in the selection of an appropriate combination of modules, modules may be classified using several schemes. For example, modules may be classified by mass, where Type I modules are the most massive, and Type III the least massive. Type I modules would include such items as power tools, lifts, and light weaponry. Type II modules would include items such as power tools, lifts, and light weaponry. Type III modules would include items such as compact electronics, such as communication gear.

In addition, modules may be classified by size, with common module sizes including ⅛, ¼, ½, and 1, and indicating the fraction of the vehicle platform area occupied by the module. Alternatively, a more simple system employs modules of either cross-wise orientation or occupying the full length of the vehicle platform.

For a given vehicle platform, selection may be performed with a simple combination scheme such as "one Type 1 module, and four Type III modules", subject to the restriction that the area of the modules not exceed the total area of the vehicle platform.

Modules can be assembled to produce a vehicle well suited for a wide variety of end uses. For example, vehicles intended for
- command, control and communication
- surveillance
- chemical detection, and
- search and rescue are among the many possibilities.

The modules are designed to have a standard mechanical connection with the underlying vehicle platform. Preferably, a mechanically simple system such as a clevis pins is employed, ensuring for simple, rapid, and reliable installation of the modules.

The invention addresses a further problem of providing services to the modules. Services could include such things as high voltage AC power, low voltage DC power, 25 volts or 12 volts. There may be a need for cooling if the modules that are attached to the platform include heat generating devices, whether it is water-cooling or some other capacity. It may be necessary to provide air pressure. For example, if a pneumatic mast is provided, then there must be an air compressor associated with the vehicle. In this case, air would have to be distributed to the various elements that require pneumatic power. Hydraulic fluids would also need to be distributed, for example if there is a power take-off on the truck which runs on a hydraulic system to operate various implements that are built into it. Installation of each module engages, preferably automatically, a series of connections, including electric, hydraulic 12 (see FIG. 1), and pneumatic power 13 (see FIG. 1). Data can be passed over Ethernet or similar connection. Video connections can also be provided.

Figure 10:
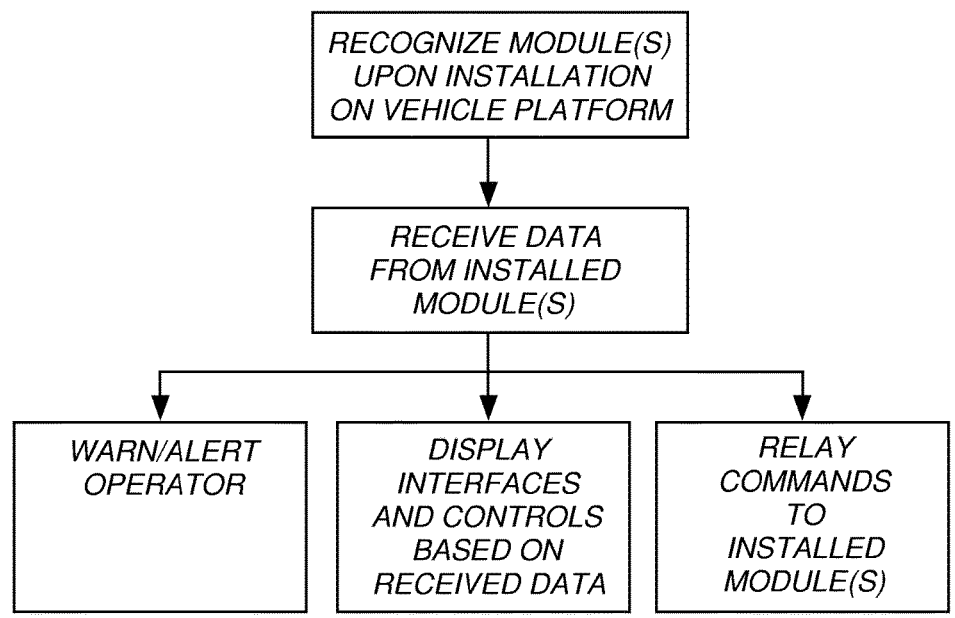
FIG. 10 is a flowchart of an illustrative control scheme for coordination of the modules in accordance with an embodiment of the present invention.

Coordination of the modules is handled by a central computer in communication with each module. Two control schemes are envisioned. In the first scheme, such as seen in FIG. 10, the central computer is equipped with software capable of controlling the equipment within each module. Upon installation, each module identifies itself. In response, the central computer displays to the operator interfaces and controls appropriate for operation of the installed module, and relays commands received through the interface and controls to the equipment within the module. In this scheme, the central computer contains software appropriate for operation of each module that may potentially be installed.

In the second scheme, each module is equipped with a dedicated microprocessor for control of equipment within the module. Upon installation, each module identifies itself. During operation, the computer onboard the module sends information to the central computer indicating a set of operator interfaces and controls appropriate for operation of the module. The central computer need only coordinate the display of the control interfaces for the several installed modules. As such, the central computer can be forward compatible with newly designed modules.

Identification of installed modules and coordination of module control may be implemented through a protocol such as Sun Microsystems's Jini.

FIG. 1 shows a vehicle platform frame 10 for receiving modules of a modular vehicle in accordance with an embodiment of the present invention. The frame is of a standard width that matches the width of a mounting bracket on the base of each module. Holes 11 of a standard size are drilled at regular intervals along the length of the frame for receiving mounting pins that secure each module mounted on the frame.

Figure 2:
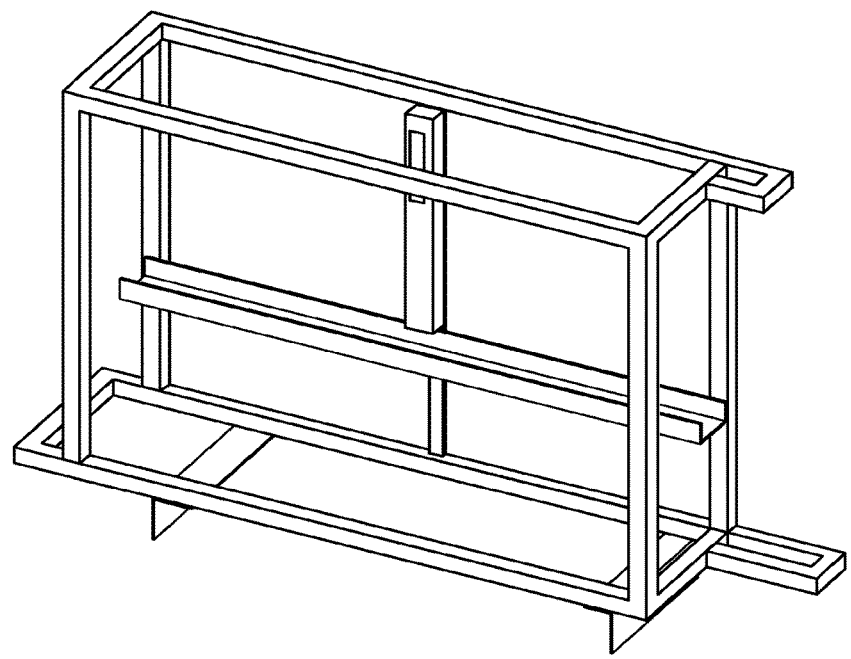
FIG. 2 shows a frame of a first module in accordance with an embodiment of the present invention.
Figure 3:
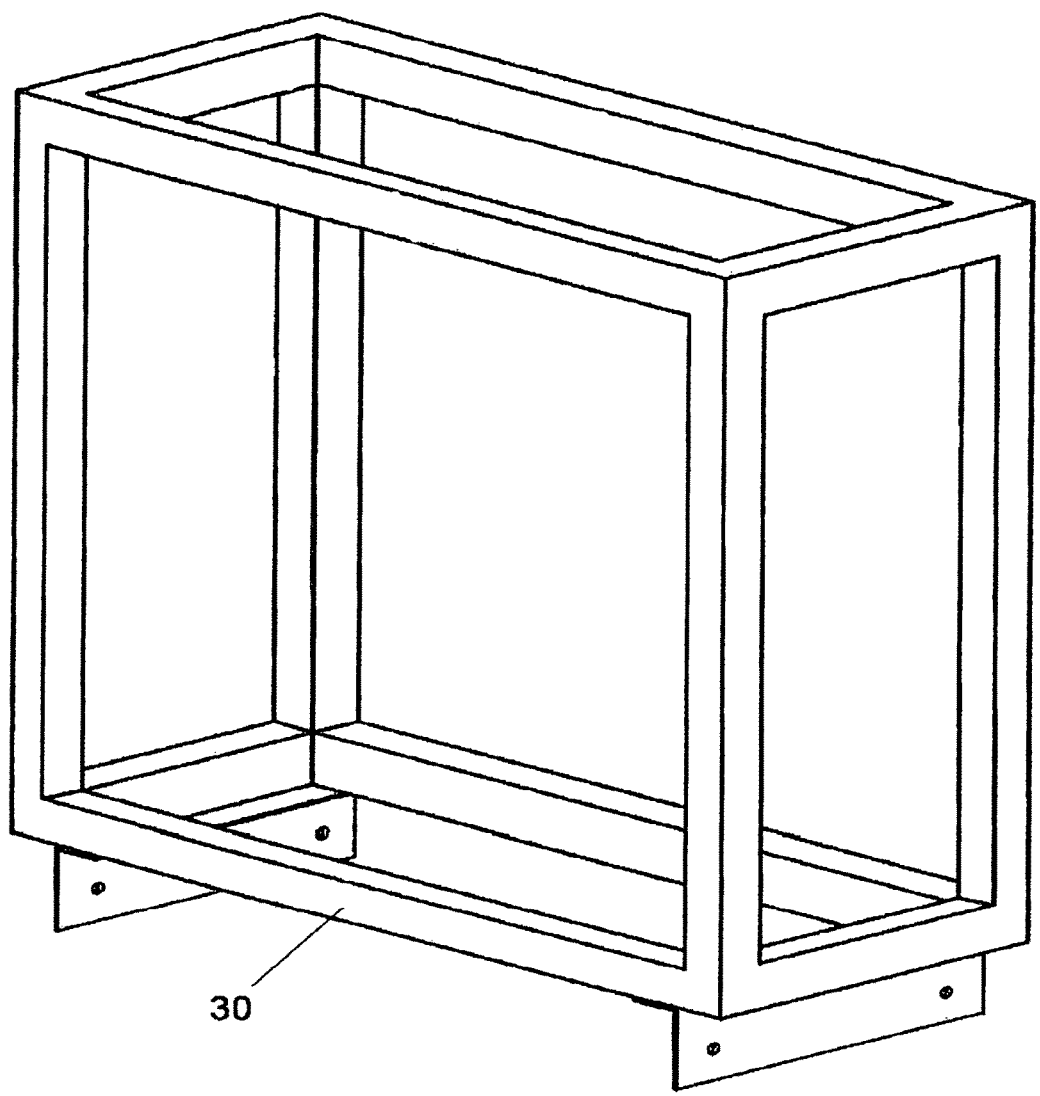
FIG. 3 shows a frame of a second module in accordance with an embodiment of the present invention.
Figure 4:
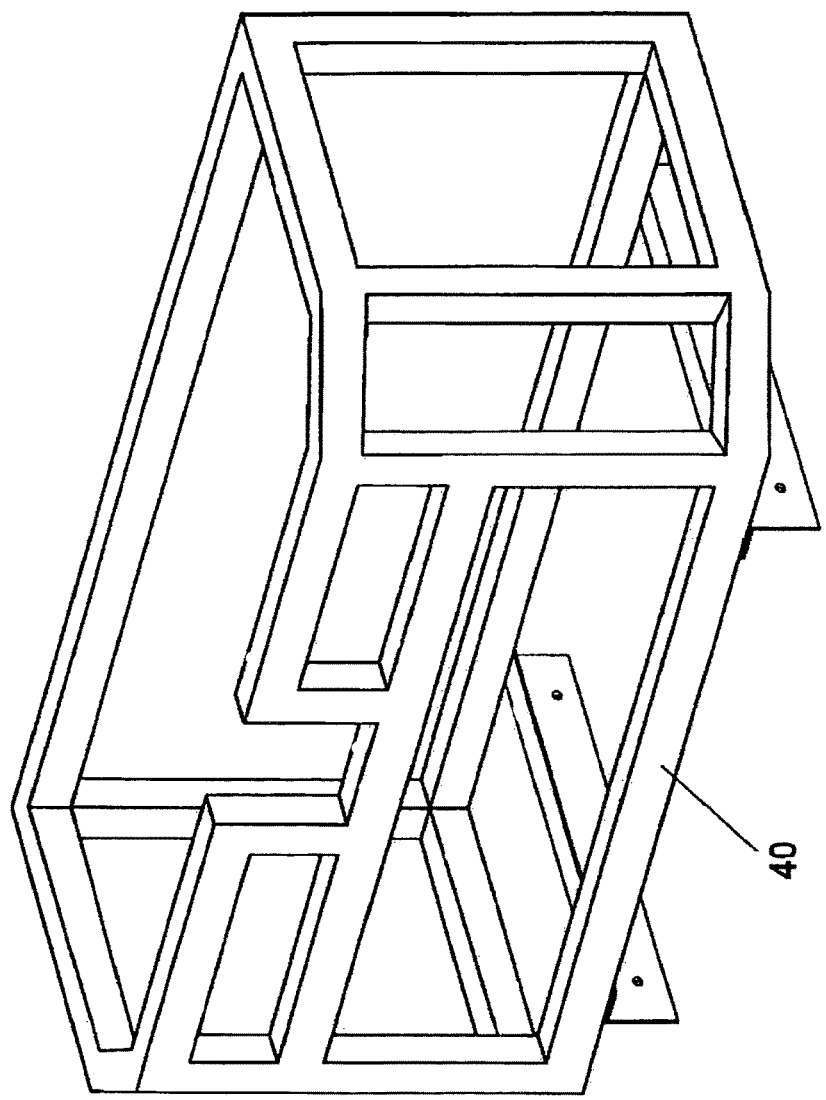
FIG. 4 shows a frame of a third module in accordance with an embodiment of the present invention.

FIG. 2 shows a frame 22 of a first module in accordance with an embodiment of the present invention. The forward-rearward length 23 of the frame is a standardized fraction of the vehicle platform frame. The width of the mounting bracket 20 on the base of the module frame matches that of the vehicle platform frame. Holes 24 drilled in the module frame match the holes placed at regular intervals on the vehicle platform frame. Similarly, FIGS. 3 and 4 show a frame of a second 30 and third 40 module respectively, in accordance with embodiments of the present invention.

Figure 5:
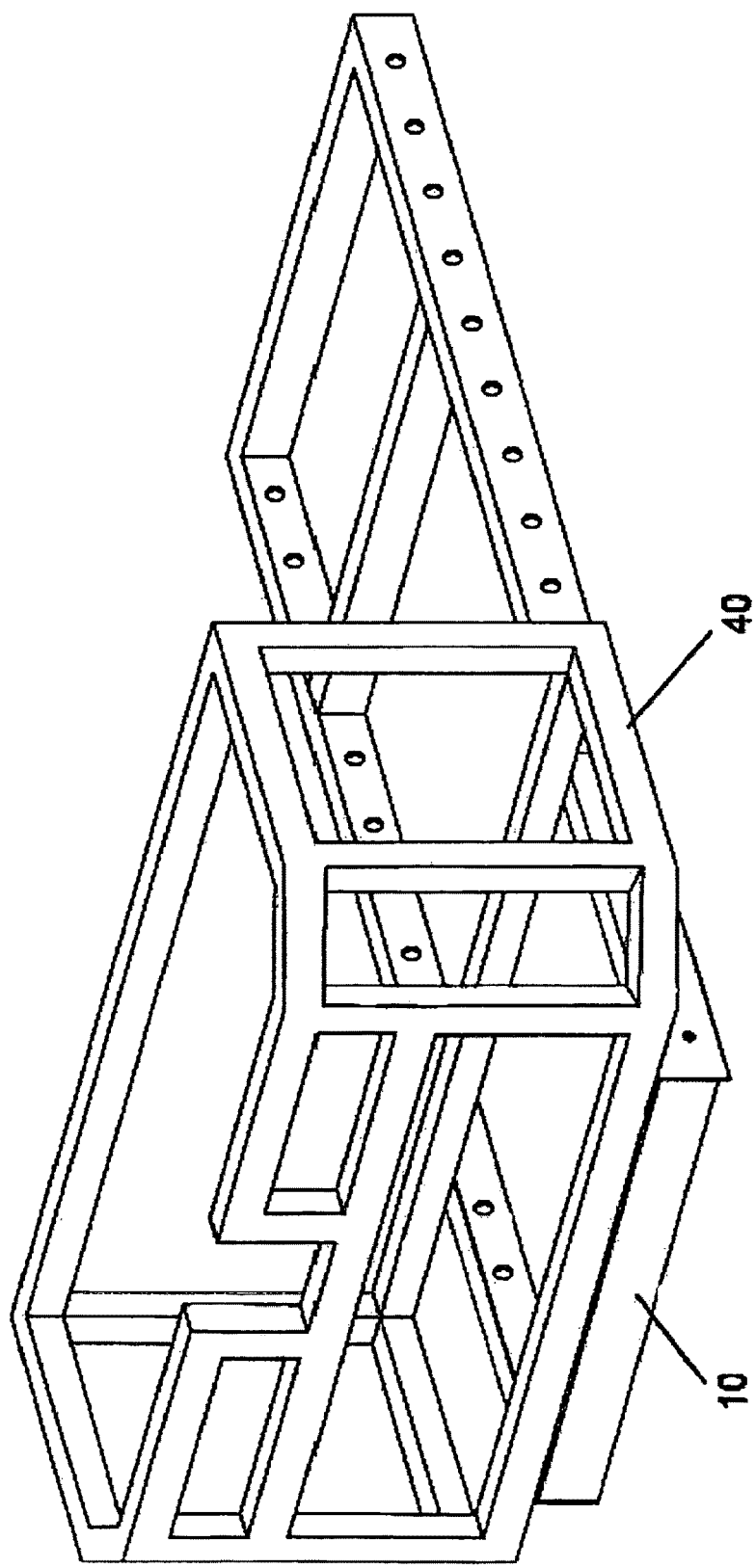
FIG. 5 shows a frame of a third module engaged with the vehicle platform frame in accordance with an embodiment of the present invention.
Figure 6:
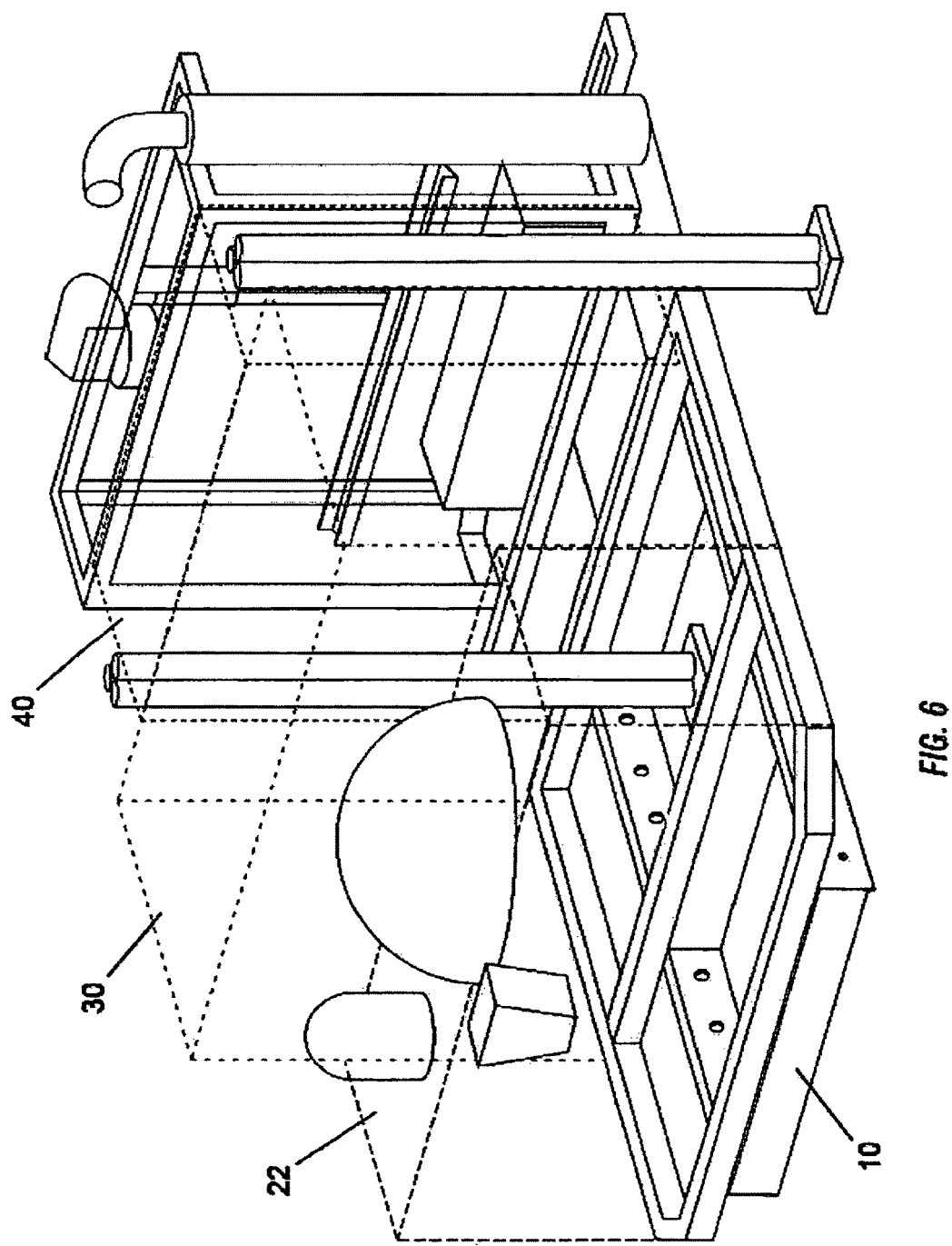
FIG. 6 shows the first, second and third modules engaged with the vehicle platform frame in accordance with an embodiment of the present invention.

FIG. 5 shows the frame of the third module 40 engaged with the vehicle platform frame 10. The standardized width and hole spacing of the vehicle platform frame and module mounting bracket ensure that the module can be placed at a variety of locations on the vehicle platform frame. FIG. 6 shows the first 22, second 30, and third 40 modules engaged with the vehicle at the vehicle platform frame 10.

Figure 7:
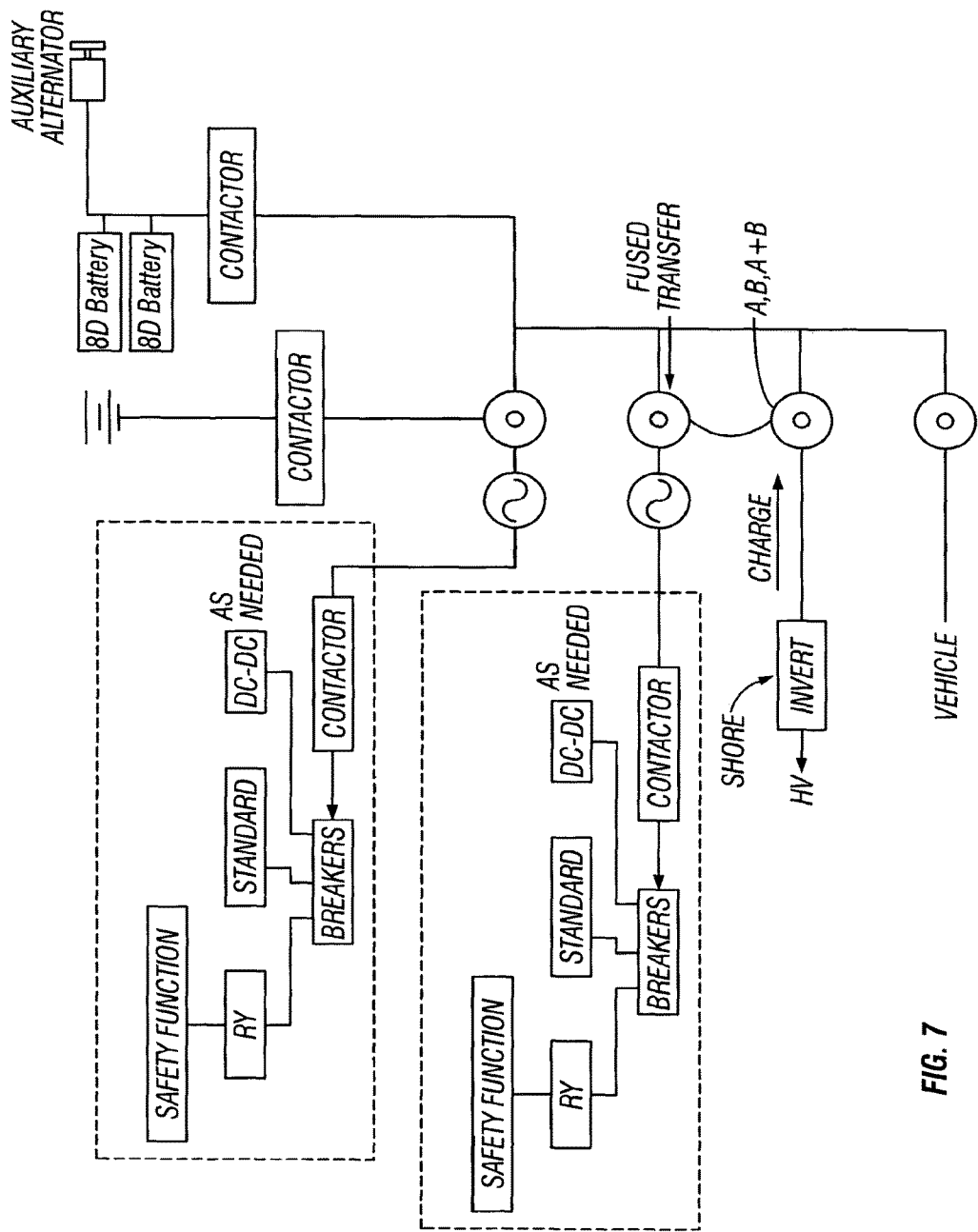
FIG. 7 shows a power distribution scheme for a modular vehicle in accordance with an embodiment of the present invention.

FIG. 7 shows a power distribution scheme for a modular vehicle in accordance with an embodiment of the present invention. The power system onboard each module (indicated by the dashed box 70 provides power to one or more safety functions 71 and is connected thereto by a relay 72, breaker 73, and contactor 74 to a fused transfer 75. The relay is controlled directly from within the cabin of a modular vehicle. Power is also provided directly from the breaker to the non-safety functions 76 of the module. The power within each module may also contain a DC-DC conversion 77 to alter the voltage supplied to the module.

The fused transfers are also connected via a contactor to the vehicle batteries 78, and to the electrical systems of the non-module vehicle devices 80. A connection is also provided, via another contactor, to a one or more "technical batteries" 79 contained in the power module. These batteries may be charged directly from an auxiliary alternator 81.

Finally, the fused transfers are connected to an inverter 82 that can provide power to the vehicle when connected to a 120V shore power line. This allows for powering of all vehicle and module devices directly from the shoreline, and for charging of the vehicle and power module batteries.

Figure 8:
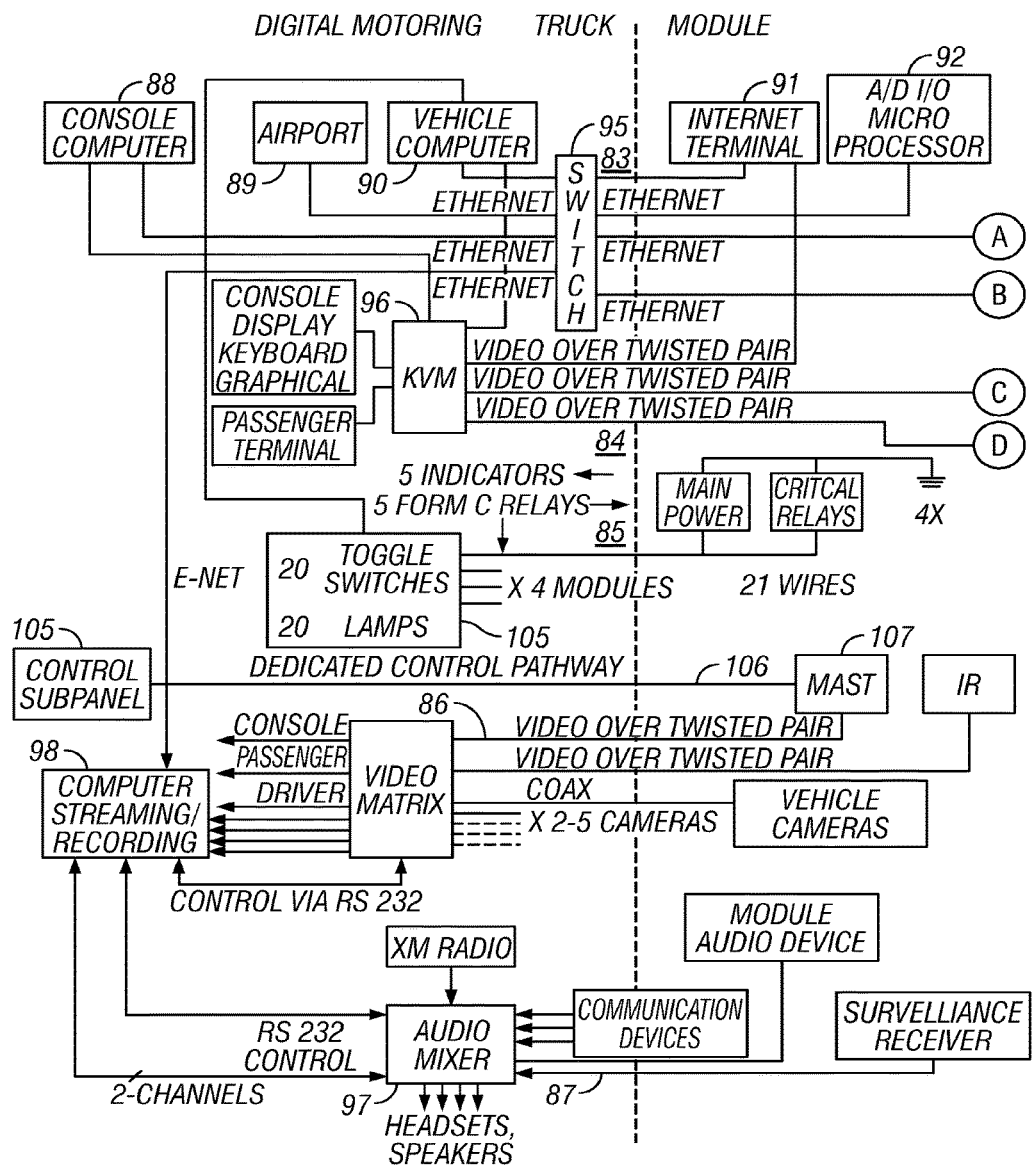
FIG. 8 shows a control scheme for a modular vehicle in accordance with an embodiment of the present invention.
Figure 8:
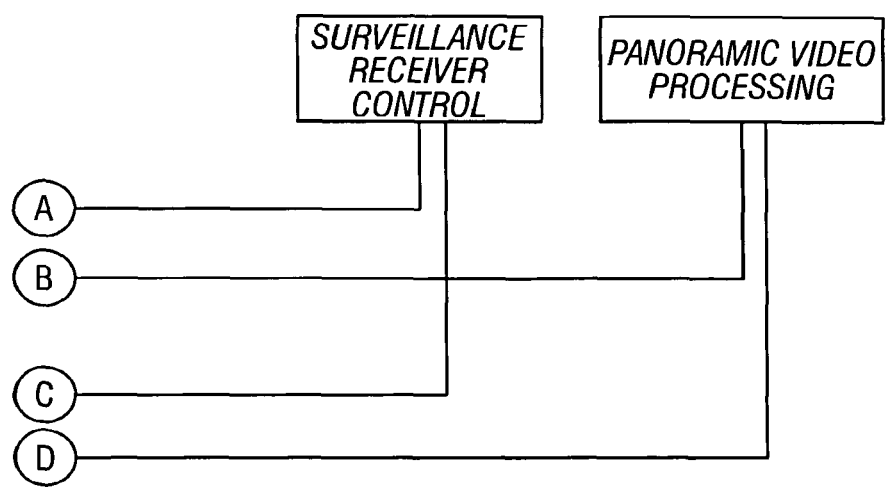

FIG. 8 shows a diagram illustrating a control scheme for a modular vehicle in accordance with an embodiment of the present invention. In the diagram shown, lines 83 carry communications between peripherals and computers, lines 84 carry data, lines 85 carry communications with safety functions, lines 86 carry indicate video signals, and lines 87 carry audio signals.

The invention also provides a dedicated control pathway 106 that allows sub panels 105 to be placed, for example, inside the cab providing direct control of potentially dangerous elements that would not typically be run through a general purpose control system running on a vehicle computer. For example, for a military weapons system, a separate control might be provided. For civilian use, there may be a mast 107 that elevates, and a standard control system may cause the mast to raise at an inappropriate time, thereby creating a safety hazard. Such functions as control of weapons or the mast are referred to as mission critical elements that must be controlled and cannot be subject to computer error or bugs.

The safety functions are controlled directly from a control panel 105 containing a number of toggle switches. For each module, a switch is assigned to the main module power. A number of other switches are assigned to each safety critical function on the module. Each toggle switch is connected with the corresponding module function with a dedicated wire. Additionally, the control panel may be connected to the vehicle computer to monitor the vehicle state.

Data are carried via an Ethernet carried on Category 5 twisted pair wiring. The console computer 88 with which an operator interfaces, the airport wireless (802.11) networks 89, the vehicle computer 90, the satellite tracking Internet terminal 91, the analog/digital input/output microprocessor 92, surveillance receiver controls 93, and the panoramic video processing unit 94 are all connected to the Ethernet via an Ethernet switch 95.

The peripherals also operate over Category 5 twisted pair wiring. All peripherals are integrated with a Category 5 KVM switch 96.

Video signals obtained from devices throughout the main vehicle and modules are routed along Category 5 wiring to an appropriate destination using a matrix switch. Greater detail is provided in FIG. 9.

Finally, the audio obtained from the surveillance receivers, as well as other sources such as satellite radio, is handled by an audio mixer 97. The audio is also routed over Category 5 wiring. The behavior of the audio mixer is addressable using serial controls form the video streaming device and video recorder 98.

Figure 9:
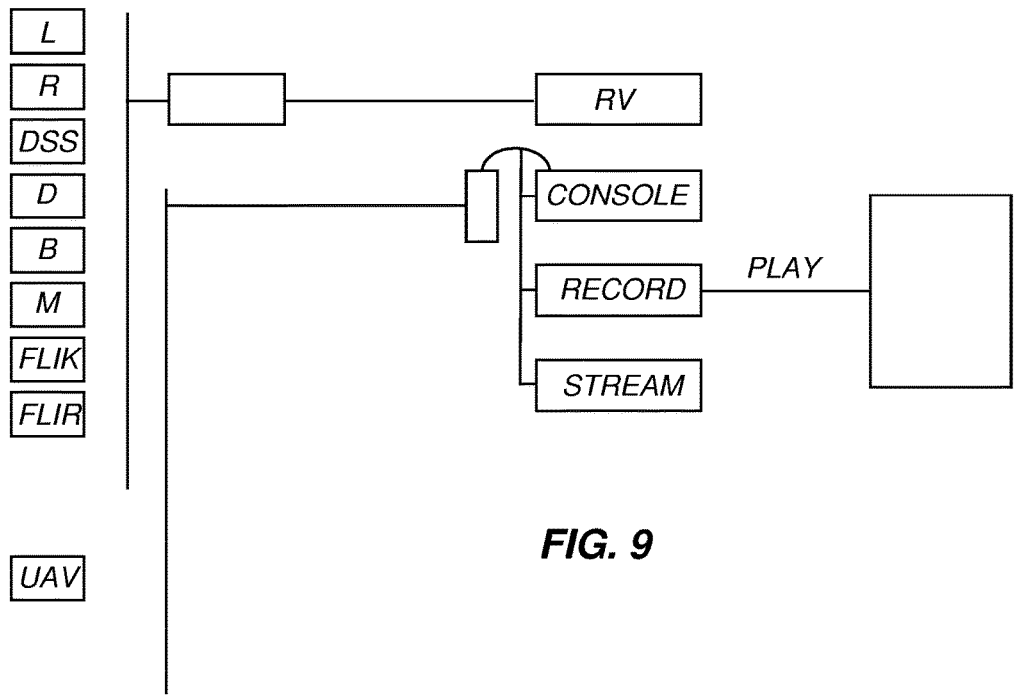
FIG. 9 shows a scheme for routing video signals in a modular vehicle in accordance with an embodiment of the present invention.

FIG. 9 shows a scheme for routing video signals in a modular vehicle in accordance with an embodiment of the present invention. Video from leftward (L), rightward (R), downward (D), and backward (B) viewing cameras; a mast mounted camera (M), and a forward looking infrared camera (FLIR); a digital satellite system (DSS), and a weapons system cameras (W) are all provided to a 12×4 matrix switch 99. The switch provides signals to a video-streaming server that may provide selected video signals to remote locations over a communications network. Preferably, the video-streaming server 100 may handle more than one signal simultaneously, and also incorporates audio from the audio mixer, as in FIG. 8. Video signals are also provided to a video recording device 101 and a console based monitor 102. Finally, signals may be routed to a display 103 integrated into a rear view mirror of the vehicle.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A control system configured with one or more established operating relations for operating a modular vehicle, wherein the modular vehicle includes a vehicle platform that is configured to receive one or more selected modules of a plurality of modules at a selected location on the vehicle platform, furthermore the control system comprises a processor, embodying instructions, which when executed by the processor performs steps comprising:
   recognizing one or more of the selected modules upon installation of the one or more modules at the selected location on the vehicle platform;
   receiving preloaded data from the one or more installed modules, wherein the preloaded data comprises attributes related to each module respectively; and
   communicating an alert to an operator based on the received attributes and one or more established operating relations.

2. The control system of claim 1, wherein the step of recognizing further comprises the processor being operably configured to receive a unique characteristic related to each of the one or more installed modules.

3. The control system of claim 2, wherein the unique characteristic comprises a serial number and/or a bar code.

4. The control system of claim 1, wherein preloaded data attributes related to each module includes any of: a weight of an installed module, a size of an installed module, a power requirement of an installed module, a capability of an installed module, or a history of an installed module.

5. The control system of claim 4, wherein the history of an installed module includes any of: a past problem for the installed module or total operating time for the installed module.

6. The control system of claim 1, wherein the processor is further configured to inhibit a functionality of the one or more installed modules based on the received attributes and established operating relations.

7. The control system of claim 1, wherein the processor is further configured to calculate a center of gravity of the modular vehicle and one or more installed modules.

8. The control system of claim 1, wherein two or more modules are installed on the modular vehicle and the processor is further configured to determine capabilities for a combination of the two or more installed modules.

9. The control system of claim 8, wherein the processor is further configured to determine if a combination of installed module attributes fit within design limits of the modular vehicle platform.

10. The control system of claim 8, wherein the processor is further configured to determine that the combination of installed modules is unsafe and/or unworkable based on a combination of installed module attributes and design limits of the modular vehicle platform.

11. The control system of claim 1, wherein the processor is further configured to determine if any software, driver updates or enhancements are available and/or required for the installed modules based on the received attributes related to each module.

12. A method for integrating operation of a modular vehicle that includes a vehicle platform and a control system corresponding thereto, wherein the modular vehicle is configured to receive one or more selected modules of a plurality of modules at a selected location on the vehicle platform, and wherein each of the plurality of modules has one or more attributes related thereto, the method comprising:
   recognizing, by the control system, one or more of the selected modules upon installation of the one or more selected modules at the selected location on the vehicle platform;
   receiving, by the control system, preloaded data from the one or more installed modules, wherein the preloaded data comprises the one or more attributes related to each module respectively;
   displaying, by the control system, one or more interfaces and controls based on the received one or more attributes; and
   relaying one or more commands, via the control system, to the one or more installed modules, wherein the commands are received through the displayed one or more interfaces and controls.

13. The method of claim 12, wherein the step of recognizing comprises receiving unique characteristic related to each of the one more installed modules.

14. The method of claim 13, wherein the unique characteristic comprises a serial number, a bar code, or a configuration of mechanical pins at a point of engagement between the vehicle platform and the one or more installed modules.

15. The method of claim 12, wherein preloaded data attributes related to each module, of the plurality of modules, includes any of: a weight of an installed module, a size of an installed module, a power requirement of an installed module, a capability of an installed module, or a history of an installed module.

16. The method of claim 12, further comprising:
   inhibiting, by the control system, a functionality of the one or more installed modules based on the received attributes and one or more established operating relations.

17. The method of claim 12, wherein two more modules are installed on the modular vehicle and the method further comprises:
   determining, by the control system, capabilities for a combination of the two or more installed modules.

18. The method of claim 17, wherein the determining further comprises:
   receiving data files, at the control system, from each installed module, that inform the control system of module capabilities.

19. The method of claim 17, further comprising:
   determining, by the control system, that a combination of installed module attributes fit within design limits of the modular vehicle platform.

20. The method system of claim 19, further comprising:
   communicating an alert to an operator based on the received attributes and one or more established operating relations.

21. A modular vehicle, comprising:
   a vehicle platform including a plurality of locations that are configured to receive one or more selected modules of a plurality of modules, wherein each of the plurality of modules has attribute data stored thereon; and
   a control system including a processor configured with one or more operating relations and instructions that when executed performs steps including:
      recognizing one or more of the selected modules upon installation of the one or more selected modules at one or more of the locations on the vehicle platform; and
      receiving the attribute data from the one or more installed modules; and
      communicating an alert to an operator based on the received attribute data and the one or more established operating relations.

* * * * *